United States Patent [19]

Doucet

[11] Patent Number: 4,707,259
[45] Date of Patent: Nov. 17, 1987

[54] FILTER WITH SUPERPOSED RINGS FOR FILTERING LIQUIDS

[76] Inventor: Charles Doucet, 13, avenue Lèonard Sismondi, 1224 Chêne-Bougeries/Genève, Switzerland

[21] Appl. No.: 939,240

[22] Filed: Dec. 8, 1986

Related U.S. Application Data

[63] Continuation of Ser. No. 712,847, Mar. 18, 1985, abandoned.

[30] Foreign Application Priority Data

Mar. 29, 1984 [CH] Switzerland .................. 1594/84

[51] Int. Cl.[4] ............................................. B01D 29/46
[52] U.S. Cl. ..................................... 210/351; 210/352; 210/356; 210/411; 210/453; 210/488
[58] Field of Search ............... 210/351, 352, 356, 411, 210/453, 488, 492

[56] References Cited

U.S. PATENT DOCUMENTS

| | | | |
|---|---|---|---|
| 1,643,299 | 9/1927 | Furness | 210/488 |
| 2,141,436 | 12/1938 | Harris | 210/488 |
| 2,569,413 | 9/1951 | Giauque | 210/492 |
| 2,601,616 | 6/1952 | Kasten | 210/488 |
| 2,999,598 | 9/1961 | Schade | 210/488 |
| 3,568,845 | 9/1971 | Llamas | 210/488 |
| 3,622,003 | 11/1971 | Czech | 210/488 |
| 3,648,843 | 3/1972 | Pearson | 210/447 |
| 4,402,829 | 9/1983 | Cordua | 210/411 |
| 4,430,232 | 2/1984 | Doucet | 210/488 |

FOREIGN PATENT DOCUMENTS

| | | | |
|---|---|---|---|
| 158827 | 5/1938 | Austria | 210/488 |
| 1104491 | 4/1961 | Fed. Rep. of Germany | 210/488 |

Primary Examiner—Ernest G. Therkorn
Attorney, Agent, or Firm—Martin Smolowitz

[57] ABSTRACT

A disk filter of the counter-current flow cleaning type, containing superposed ring-shaped elements (12) form a body (9) of a generally cylindrical shape. The elements are arcuate so as to form between them passages which are arcuate and oblique in relation to the axis of the filter when viewed in a cross section taken along the axis of the filter. Stopping means (19, 20) are provided on the filter elements (12) which abut against the adjacent filter element (12) during the filtering to prevent the filter elements (12) from vibrating, while allowing their vibration to occur when the filter is cleaned by a counter-current flow of liquid.

7 Claims, 6 Drawing Figures

FILTER WITH SUPERPOSED RINGS FOR FILTERING LIQUIDS

This application is a continuation of application Ser. No. 712,847, filed Mar. 18, 1985, now abandoned.

BACKGROUND OF THE INVENTION

This invention pertains to disc type filters and particularly to a disc type filter utilizing a plurality of coaxial superposed rings made arcuate shaped for a more effective filtering and cleaning action.

A disc filter of the counter-current flow cleaning type was described by U.S. Pat. No. 4 430 232, which comprises a series of coaxial ring-shaped filter elements forming a body of a generally cylindrical shape and having between them ring-shaped filtering passages which extend radially from the axis of the filter. In practice however, this filter proved to have the following shortcomings:

When water flows through the filter either during the filtering or the cleaning of the filter, the filter elements vibrate intensely; and the vibration of the filter elements produces an unpleasant noise.

This vibration also produces an abnormal wear of the filter elements, which is due to the abrasion caused by the impurities contained suspended in the liquid and subsequently retained by the filter. This vibration further causes the particulate impurities to desegregation into smaller fragments which cannot be retained by the filter any more. It would be desirable to avoid this desegregation and retain such particulate impurities in the filter. This vibration of the filter elements further produces undesirable changes in the crystalline structure of the weldings, which makes them weak and prone to breaking.

On the other hand however, a vibration of the filter elements ensures advantageously a perfect cleaning of the filter in a very short time, of the order only of several seconds. Furthermore, the filter described in the above-mentioned patent exhibits the following behaviour when it is operated:

When the liquid flows inside the filter at its normal speed, it only passes through the passages between the filter elements of the downstream section of the filter. This phenomenon is of little importance during the filtering, because once the downstream passages are blocked up, the filtering takes place progressively further upstream of the filter body. However, when the filter is subjected to a counter-current flow cleaning, only the downstream section of the filter is actually cleaned, which imposes limitations on the length which can be given to the filter. This problem can be overcome to some extent by placing one or several baffles or deflectors inside the filter, so as to achieve a flow distribution along the filter as uniform as possible. However, this complicates the construction of the filter. Also, the weldings which hold these deflectors on the central shaft of the filter can yield under the vibrations for the same reasons as discussed above.

SUMMARY OF THE INVENTION

The purpose of the present invention is to provide a significantly improved disc type filter which obviates the problems associated with the filter described above, but which also retains all its advantages. The invention provides a disc type filter having a plurality of superposed ring-shaped coaxial elements for filtering liquids, and arranged to be cleaned by counter-current flow of a liquid through the elements. The filter consists of a series of coaxial ring-shaped filter elements assembled to form a filter body having a generally cylindrical shape, with ring-shaped passages provided between the filter elements. Spacing elements capable of an elastic deformation are disposed between the filter elements and arranged for varying without friction the distance separating the adjacent filter elements by varying the axial pressure exerted on the spacing elements when stopping the filtering to clean the filter and when reverting from cleaning to filtering again. The filter elements have a shape to provide filtering passages which are in their portion closest to the filter axis oblique relative to the axis of the filter, when viewed in a cross section taken along the axis of the filter. Each filter element is provided with stopping means for abutting against the adjacent filter element when the filter elements are subjected to an axial pressure during the filtering, thereby ensuring that a preselected width is achieved in the narrowest part of the filtering passages, so that the filter elements are prevented from vibrating during the filtering phase as a result of the liquid flowing between the filter elements, but the stopping means is freed from their contact with the adjacent filter element during the cleaning of the filter to allow the filter elements to vibrate, thereby improving the cleaning action.

BRIEF DESCRIPTION OF THE DRAWING

The appended drawings illustrate by way of example an embodiment of the filter of the invention; in which

FIG. 1a is a fragmentary view related to FIG. 1;

DESCRIPTION OF THE PREFERRED EMBODIMENT

Figure 5:
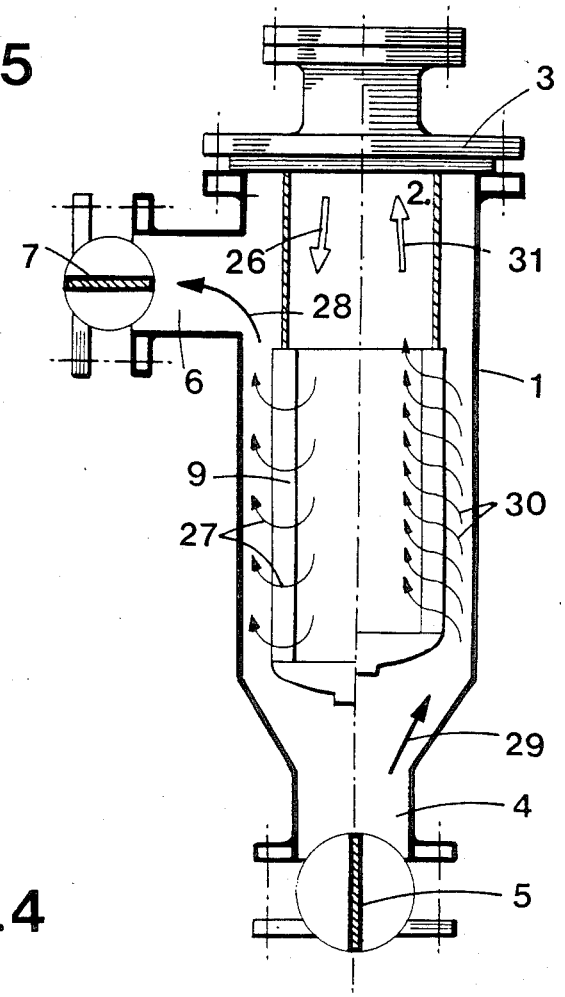
FIG. 5 is a general schematic cross section view taken along the axis of the filter and which shows how the liquid flows during the filtering and during the counter-current cleaning.

The filter illustrated in the drawings comprises a casing 1 of a generally cylindrical shape which is provided on one of its ends 2 with a flange 3, and with a valve 5 provided on the opposite end 4. The casing 1 is further provided in the vicinity of the end 2 with a lateral outlet 6, in which a valve 7 is mounted (FIGS. 1 and 5).

The flange 3 is integral with a cylinder or tube 8, which is mounted coaxially inside the casing 1 to extend along a section thereof in the vicinity of the lateral outlet 6. As can be seen in FIG. 1, the upper end of the space comprised between parts 1 and 8 is closed by the flange 3.

At the end opposite to the flange 3, the cylinder 8 is fastened to a filter body 9, which will be described in detail hereafter.

Figure 1:
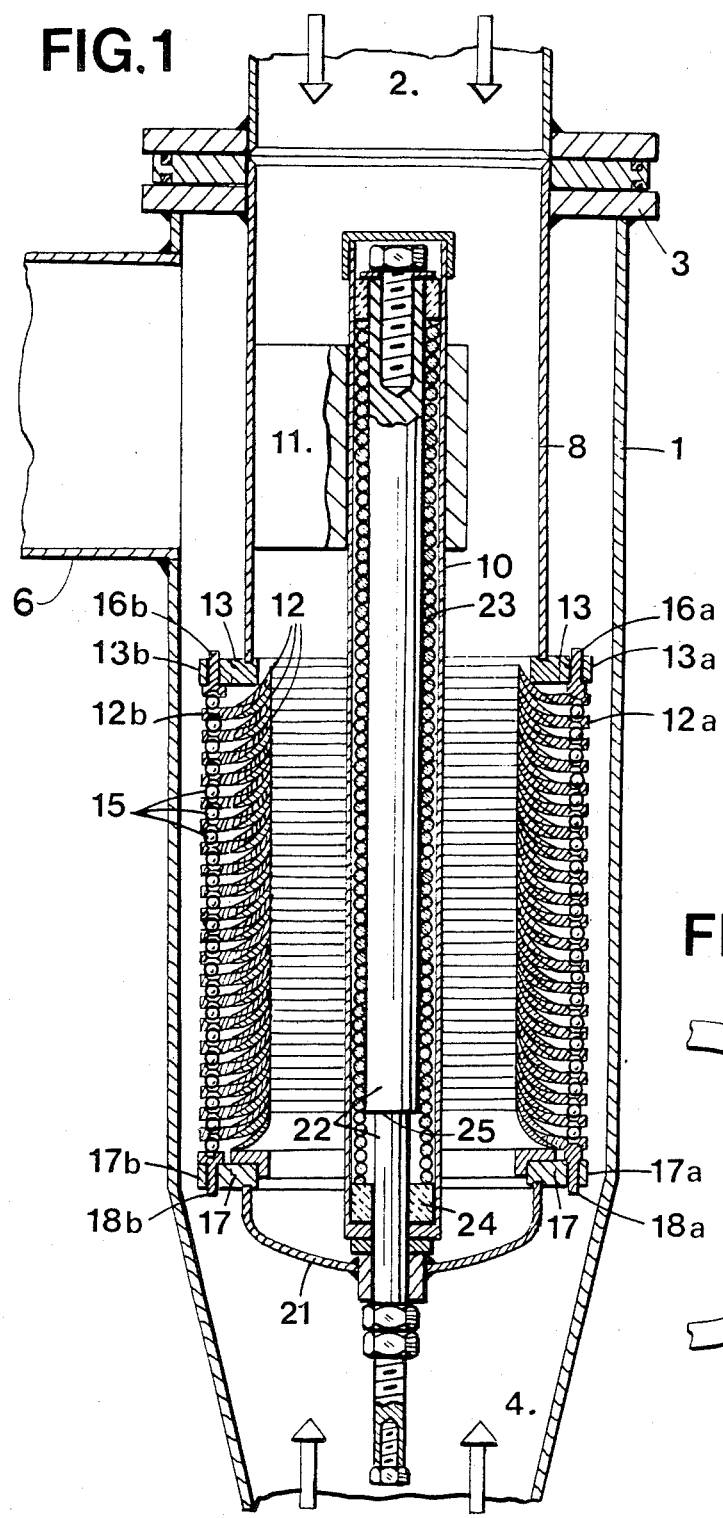
FIG. 1 is a general cross section view of the filter assembly.

Another cylinder or tube 10 is mounted coaxially inside the cylinder 8 by means of radial arms 11, of which only one is shown in FIG. 1.

The filter body 9 is made of a plurality of identical ring-shaped filter elements 12 placed coaxially one on top of the other, thus forming an assembly of a generally cylindrical shape which is fastened to the cylinder 8 in the manner described hereafter. The filter elements 12 have a shape which in the portion closest to the filter axis provides filtering passages which are oblique relative to the filter axis. Also, the distance separating the opposite surfaces of adjacent filter elements 12 is decreased from the entrance of the filtering passages, preferably at near the outer diameter of the filter body 9 to their exit at the filter body inner diameter.

The end of the cylinder 8 opposite to the flange 3 is integral with a ring-shaped plate 13, which is provided on its outside with 6 brackets 13a extending radially in such positions as to be spaced apart at 60° (FIG. 1a).

Three of the brackets 13a are spaced at 120° and each of the three remaining brackets 13b is located between two brackets 13a (FIG. 1a). Each bracket 13a is provided with an element 16a having a conical head, the function of which will be described hereafter, and each brackets 13b is provided with an element 16b having a conical seat, the function of which will be equally described hereafter.

Figure 2:
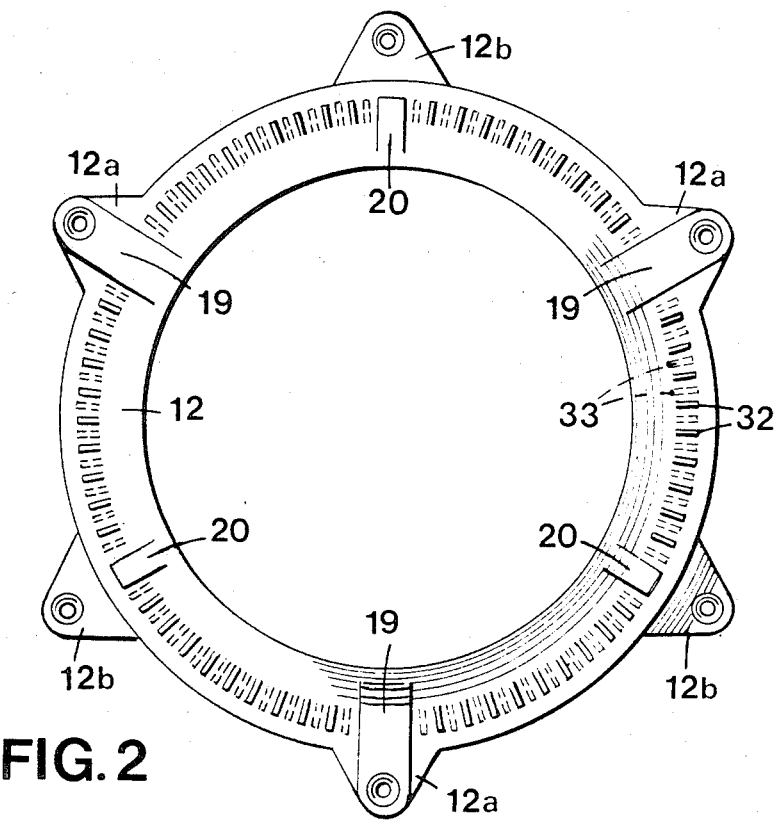
FIG. 2 is an end view of the filter body with the remaining components of the filter removed.

Each filter element 12 also has three brackets extending radially outwardly and spaced at 120°. Further, each filter element of the series is disposed so as to form a 60° angle with both its neighboring filter elements. For example, the first filter element of the filter body 9 which is found immediately underneath the ring-shaped plate 13 has its brackets 12a disposed as shown in FIG. 2. The following element 12 is hidden by the first filter element, except for its three brackets 12b. All these brackets are flat and lie in planes which are perpendicular to the axis of the apparatus. Further, they are provided with conical shaped seats 14a, 14b on their two opposite sides (see FIG. 4).

Between each conical seat 14a of a given filter element 12 and the conical seat 14b of the second after the next filter element, there is provided a ball 15 which is made of a substantially incompressible elastic material such as rubber. The successive elements 12 being positioned at 60° one relatively to the other as was described above, balls 15 are found at the same level as any particular filter element where they are held between two brackets 12a, and balls 15 are identically found at the same level as the two neighboring elements where they are held between two brackets 12b.

At the upper end of the filter body 9 where the ring-shaped plate 13 is located, the conical heads of the three elements 16b cooperate each with one conical seat 14a of the first filter element of the assembly, while a ball 15 is found between the conical seat of each element 16b, and one of the three conical seats 14a of the following filter element of the assembly forming the filter body 9.

At the other end of the filter body 9, a similar arrangement is found. The ring-shaped plate 17 which is identical to the plate 13 is provided on its outside with 6 brackets 17a, 17b extending radially in such positions as to be spaced at 60°. Three of these brackets 17a are each provided with an element 18a having a conical head for cooperating with a conical seat 14b of the last filter element 12. The three other brackets 17b are each provided with an element 18b having a conical seat for cooperating with a ball 15, which further cooperates with a conical seat 14a of the last but one filter element 12 of the body 9.

Each filter element 12 is provided on one side with three ribs 19, each such rib being located at the same place as one of the three brackets 12a or 12b. Each filter element 12 is also provided with three intermediate ribs 20 which are positioned so that the six ribs be spaced at 60°. The side of the six ribs facing an adjacent filter element 12 has exactly the same profile as the section of said filter element found immediately opposite. Accordingly, when the filter body is subjected to an axial compression as will be described hereafter, the ribs abut against the adjacent filter elements 12 to prevent these filter elements 12 from coming too close together.

The ring-shaped plate 17 is fastened to a sort of a round lid 21 which closes the filter body 9 at its bottom (FIG. 1). The lid 21 is further fastened in its central part to a shaft 22 which is mounted axially inside the tube 10. Shaft 22 is provided at its upper end with stopping means against which comes one end of a spring 23 disposed between the shaft 22 and the tube 10. The other end of the spring 23 comes against the stopping means 24 which are integral of the tube 10.

When the valve 5 is open and the valve 7 is closed during the filtering phase, the spring 23 urges the filter elements 12 together. The elastic balls 15 are flattened by the pressure of the spring 23 until the filter elements abut one against the other while the filter is in the filtering phase. The dynamic pressure exerted on the lid 21 by the flowing liquid acts in the same direction as the spring. Stopping means are provided to prevent fatigue in the filter assembly.

Conversely, when the valve 5 is closed and the valve 7 open during the filter cleaning phase, the pressure of the liquid flowing counter-currently urges the lid 21 downwards and acts on the spring 23 to allow the balls 15 to resume their original spherical shape and the filter elements 12 to part, thus freeing the impurities which were retained between the filter elements 12 during the filtering.

The filter elements 12 having parted, the flowing water radially outwardly causes them to vibrate, which hastens the cleaning of the filter body 9.

Figure 4:
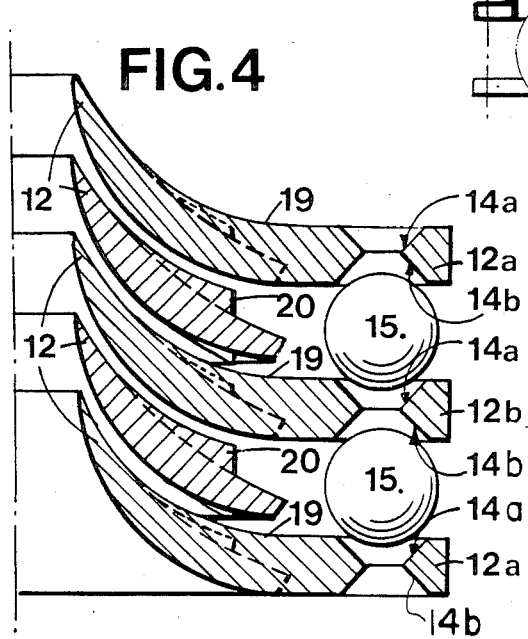
FIG. 4 is a view similar to that of FIG. 3, but shows the filter elements during the counter-current flow cleaning.

FIG. 4 shows the relative position of the filter elements 12 when the valve 5 is closed and the valve 7 open, i.e. when the filter is being cleaned by a counter-current flow of water. The water arrives into the filter through the end 2, then flows axially inside the filter body 9 and radially outwardly between the filter elements 12 to exit through the auxilliary outlet 6. (The valve 7 is open during the cleaning of the filter). The filter elements 12 are forced apart as much as possible under the action of spring 23 and by the pressure of the flowing liquid acting against the inner face of lid 21, and the impurities which they had retained during the filtering are easily flushed out by the cleaning liquid. The cleaning process is further hastened by the vibrations of the filter elements 12 caused by the flowing water and made possible by the fact that the ribs 19,20 have parted from the adjacent filter elements 12.

The arrows 26, 27 and 28 (FIG. 5) indicate how the cleaning liquid flows in the filter in the cleaning phase.

When the cleaning phase is terminated, the valve 5 is opened to allow the water to be filtered by the filter elements 12. The auxilliary valve 7—which was open during the cleaning phase—is now closed. The flow is thus inverted, and the pressure of the flowing liquid against the outer face of the lid 21 causes a compression of the spring 23 and a flattening of the balls 15 and urges the filter elements 12 together. The liquid then flows radially inwardly through the filter as indicated by the arrows 29, 30 and 31. As was explained previously, the filter elements 12 are urged together as close as possible, leaving accurately calibrated passages between them. These passages between the filter elements 12 become progressively narrower as the liquid proceeds inside them until a minimal width is reached, which depends on the size of the smallest particles to be retained. The smallest particles are therefore retained at the end of the passages where they are the narrowest, while the larger particles are retained at the entrance of the passages between the adjacent filter elements (12). Therefore, a stratification of the impurities according to their size occurs, which improves considerably the filtering action.

The arcuate shape of the passages between the filter elements 12 further insures that straight thin impurities (for example small straight twigs) are retained by the filter.

To retain impurities which are flat and relatively broad, while being thinner than the narrowest section of the passages (such as for example leaves or twigs), the following means are provided. Ribs 32 are provided on one side of each filter element 12 and ribs 33 are provided on the other side of the filter element 12 in a staggered arrangement. These small ribs form a sort of a grid retaining impurities which are very thin but at the same time rather broad.

Figure 3:
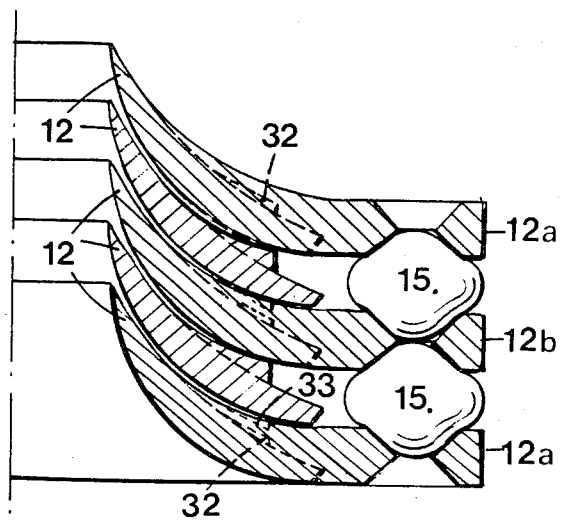
FIG. 3 is an enlarged fragmentary cross section view taken along a radial plane through the filter body and which shows the filter elements during the filtering.

When the elements 12 are in their filtering position, the balls 15 are pressed and deformed as shown in FIG. 3. When the filter cleaning is started, the balls being elastic resume their initial shape by exerting without any friction a force which causes the filter elements 12 to part one from the other.

It should be noted that the shape of the filter elements 12 when viewed in a cross section taken along the filter axis is such that the passages through which the liquid passes nearest the axis are oblique and preferably arcuate shape relative to this axis, which in practice ensures a passage of the liquid during the cleaning phase in all the passages of the filter body 9. Consequently, there is no need for deflectors inside the body.

It was found that the filter described above has the following advantage: when the flow is reduced (for example to 10% of the nominal value) very small impurities which would normally not be retained because they are smaller than the passage between the filter elements at its narrowest are retained by absorption on the surface of these elements. The same phenomenon is observed in lamellar decanters.

I claim:

1. A disc-type filter with superposed rings arranged to be cleaned by counter-current flow of a liquid and consisting of a series of coaxial ring-shaped filter elements assembled to form a filter body of a generally cylindrical shape around a filter axis, with ring-shaped passages provided between the filter elements, and including spacing elements capable of an elastic deformation disposed between the filter elements and arranged for varying without friction the distance separating the filter elements by varying the axial pressure exerted on the spacing elements when stopping the filtering to clean the filter and when reverting from cleaning to filtering, wherein the improvement comprises that the filter elements (12) have a shape so as to provide filtering passages which are initially radial and progressively narrowing, said filter passages, at least in their portion closest to the filter axis where during the cleaning operation the liquid penetrates in said passages being oblique relative to the axis of the filter when viewed in a cross section taken along the axis of the filter, and that each said filter element (12) is provided with stopping means (19, 20) for abutting against the adjacent filter element when the filter elements are subjected to an axial pressure during the filtering, thereby ensuring that a preselected width is achieved in the narrowest part of the passages and that the filter elements are prevented from vibrating during the filtering as a result of the liquid flowing between the filter elements, said stopping means being freed from their contact with the adjacent filter element during the cleaning of the filter to allow the filter elements to vibrate and thereby improve the cleaning.

2. A filter according to claim 1, wherein the distance separating the opposite surfaces of adjacent filter elements (12) decreased from the entrance of the filtering passages to their exit, which ensures a stratification of the impurities in these passages according to their size.

3. A filter according to claim 1, wherein the oblique shape of the filtering elements is arcuate when viewed in a cross section taken along the axis of the filter.

4. A filter according to claim 1, wherein the stopping means (19,20) consist of ribs which are provided on one of the two sides of each ring-shaped filter element (12).

5. A filter according to claim 1, wherein said spacing elements are elastically deformable balls provided in conical seats formed in a projection of each filter element.

6. A filter according to claim 5, wherein the spacing elements are balls made of rubber.

7. A disc-type filter with superposed rings arranged to be cleaned by counter-current flow of a liquid and consisting of a series of coaxial ring-shaped filter elements assembled to form a filter body having a cylindrical-shape, with ring-shaped passages provided between the filter elements, and including spacing elements capable of elastic deformation disposed between the filter elements and arranged for varying without friction the distance separating the filter elements by varying the axial pressure exerted on the spacing elements when stopping the filtering to clean the filter and when reverting from cleaning to filtering, wherein the improvement comprises that said filtering elements (12) have a shape such as to provide filtering passages which in their portion closest to the filter axis where during the cleaning operation the liquid penetrates in said passages are oblique and arcuate in shape relative to the axis of the filter so as to provide arcuate flow passages, and each said filter element (12) is provided with rib shaped stopping means (19, 20) for abutting against an adjacent filter element when the filter elements are subjected to an axial fluid pressure during the filtering, so that the distance separating the opposite surfaces of the adjacent filter elements decreases from the entrance of the filtering passages near their outer diameter to the exit of the fluid passageways at their inner diameter, thereby ensuring that a preselected width is achieved in the narrowest part of the passages and that the filter elements are prevented from vibrating as a result of the liquid flowing between the filter elements, said stopping means being freed from their contact with the adjacent filter element during the cleaning of the filter to allow the filter elements to vibrate and improve the cleaning.

* * * * *